Jan. 4, 1955 W. W. BOELENS 2,698,899

CIRCUIT ARRANGEMENT FOR RECEIVING AND DEMODULATING FREQUENCY-MODULATED OSCILLATIONS

Filed Nov. 30, 1949

INVENTOR.
WILLEM WIGGER BOELENS
BY [signature]
AGENT

United States Patent Office

2,698,899

Patented Jan. 4, 1955

2,698,899

CIRCUIT ARRANGEMENT FOR RECEIVING AND DEMODULATING FREQUENCY-MODULATED OSCILLATIONS

Willem Wigger Boelens, Eindhoven, Netherlands, assignor to Hartford National Bank and Trust Company, Hartford, Conn., as trustee Application November 30, 1949, Serial No. 130,295

Claims priority, application Netherlands December 2, 1948

2 Claims. (Cl. 250—27)

This invention relates to circuit-arrangements for receiving and demodulating frequency-modulated oscillations.

In U. S. A. patent specification Ser. No. 793,496, now Patent No. 2,662,179, there is described and claimed a circuit-arrangement for receiving and detecting frequency-modulated oscillations, comprising an amplitude modulator, a frequency-detector (this is a device providing an output oscillation the instantaneous value of which is approximately proportional to the amplitude and the frequency of the oscillation supplied thereto), and a rectifier. The incoming frequency-modulated oscillation is amplitude modulated in the said modulator by a modulating auxiliary voltage and subsequently supplied to the frequency-detector, in the output circuit of which a voltage is produced which, if desired after having been amplified, is supplied as an amplitude modulating auxiliary voltage to the said modulator, the arrangement being such that undesired amplitude modulation of the incoming oscillation is decreased and the desired frequency-modulated oscillation is abstracted by the rectifier from a voltage which is proportional to the voltage produced across the input circuit of the frequency-detector.

The circuit-arrangement according to the invention is similar to this known arrangement in so far that the frequency detector is substituted for by a device, the output oscillation of which is dependent upon, but need not be proportional to the amplitude and the frequency of the oscillation supplied thereto.

According to the invention, a circuit-arrangement for receiving and demodulating frequency modulated oscillations, comprising at least an amplitude modulator and a device which supplies an output oscillation the instantaneous value of which is dependent on the amplitude and the frequency of the oscillation supplied thereto, and a frequency demodulator, the oscillation to be demodulated being amplitude modulated in the said amplitude modulator and subsequently supplied to the said device, the output oscillation of which, if desired after having been amplified, is supplied as a modulating oscillation to the said amplitude modulator, the arrangement being such that undesired amplitude modulation of the oscillation to be frequency demodulated is decreased, whilst the demodulated oscillation is taken from the output circuit of the frequency demodulator, the input circuit of which has supplied to it the input oscillation of said device, is characterized in that the frequency characteristic curve of the said device (that is the output voltage of this device as a function of the instantaneous frequency at constant amplitude of the oscillation supplied thereto) is such that the non-linearity of the frequency demodulator is compensated.

The invention will now be explained more fully by reference to two circuit-arrangements shown in Figs. 1 and 3 of the accompanying drawing, given by way of example.

Figure 2:
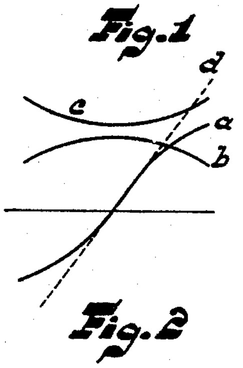

Fig. 2 shows the demodulation characteristic curve of the frequency demodulator used in the said circuits and the frequency characteristic curve of the said device.

Figure 1:
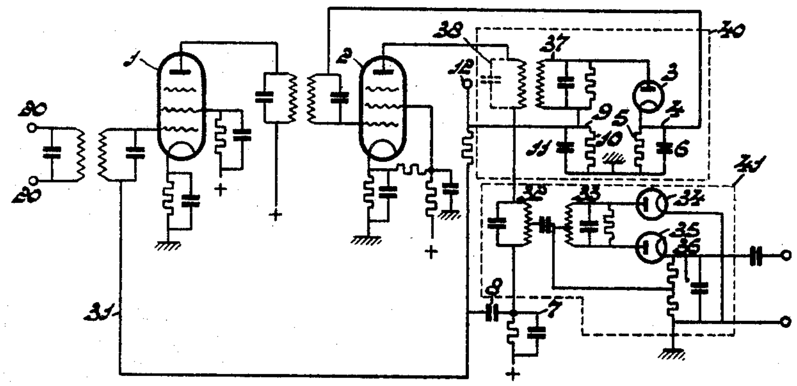

In the circuit-arrangement shown in Fig. 1, which is for the greater part similar to that shown in Fig. 1 or Fig. 2 of the drawing accompanying U. S. A. patent specification Ser. No. 106,802, now Patent No. 2,662,170, an incoming frequency modulated oscillation is supplied by way of input terminals 20 to a pre-amplifying and modulating stage 1, in which it is modulated with an oscillation supplied through a conductor 31. The output oscillation of the tube 1 is amplified again in a tube 2 and subsequently supplied to a device 40, comprising a frequency-dependent network 37, 38 and a rectifier 3 having an output filter 4, consisting of a resistance 5 and a condenser 6 having a short time-constant for the modulation frequency and across which a voltage is set up which, if desired after amplification, for example after reflex-amplification in the tube 2, is supplied as a modulating oscillation by way of a filter 7, a blocking condenser 8 and the conductor 31 to the tube 1. Owing to this manner of, for example, 100-fold, suppression of the undesired amplitude modulation of the input oscillation, the oscillation set up in the output circuit of tube 2 has an amplitude modulation which is substantially independent of the amplitude modulation of the input oscillation, but which is dependent on the frequency deviation of the input oscillation according to a function which constitutes the reciprocal of the frequency characteristic curve of the device 40. Moreover a filter 9 with a large time constant, consisting of a resistance 10 and a condenser 11 is provided to yield an A. V. C. voltage, which can be taken from an output terminal 12.

The invention utilizes the amplitude modulation of the oscillation produced in the output circuit of tube 2, which amplitude modulation is determined by the frequency characteristic curve of the device 40, to compensate the non-linearity of a frequency demodulator 41 of the receiving circuit from which the demodulated oscillation is finally derived.

The frequency demodulator 41 may be constructed, for example, in the form of a monophase frequency demodulator, in which event compensation of the second harmonic of such a detector 41, attended with suppression of the undesired amplitude modulation, is rendered possible with the use of the device 40.

If the output oscillation and the modulating oscillation were derived from the same frequency demodulator, it would be much more difficult to bring about satisfactory compensation of, for example, the second harmonic in the demodulation characteristic of the frequency demodulator from which the output oscillation is derived, without re-introducing distortion of higher order, whilst furthermore suppression of the undesired amplitude modulation would not be achieved.

In the circuit-arrangement shown in Fig. 1, the frequency demodulator 41 is constructed as a push-pull demodulator. In this case a highly attractive arrangement ensues in which the third harmonic of the frequency demodulator 41 is suppressed and all circuits used in the arrangement may be tuned to the central frequency of the incoming oscillation, which results in material simplification in the trimming of the circuit-arrangement.

The push-pull demodulator 41, therefore, comprises, as is usually the case, circuits 32 and 33, tuned to the central frequency, and demodulator diodes 34 and 35. The demodulated oscillation is derived from an output filter 36 of the frequency demodulator 41.

As appears from the article by Sturley in "Wireless Engineer," vol. 21, pages 72–78, 1944, the low-frequency output voltage of a push-pull frequency demodulator having reasonably linear demodulation characteristic, which has supplied to it the output current of a limiter, which thus has a substantially constant amplitude, exhibits a smaller value than would be possible if linearity were abandoned. For the frequency demodulator 41 to have maximum sensitivity, the dampings and the coupling of the circuits 32 and 33 are required to satisfy certain conditions. The control current, therefore, is required to increase with increasing frequency deviation for obtaining linear demodulation.

With constant control current, the frequency demodulator 41 thus exhibits a characteristic curve as indicated by curve *a* in Fig. 2. With a circuit-arrangement according to the invention the control current for a given frequency deviation is increased in accordance with curve *c* in Fig. 2, since the device 40 exhibits a frequency characteristic as indicated by curve *b* in this figure. The demodulated signal finally obtained is, thus, according to the characteristic curve *d*, dependent on the frequency deviation of the incoming oscillation, in which event compensation of the third harmonic of the push-pull demodulator 41 may be achieved substantially without the use of additional expedients, since the device 40 is already required for the suppression of the undesired amplitude modulation and, if desired, for the production of the automatic volume-control voltage set up across a filter 9 having a long time-constant. The device 40 is coupled to the output circuit of the amplifying tube 2 by way of a circuit 37 or a band-pass filter 37, 38, the circuit 37 or the circuits 37, 38 of the band-pass filter being tuned to the frequency of the incoming oscillation, and the damping of the circuit or circuits and, if desired, the coupling being so chosen that the decrease of the transmission characteristic as a function of frequency (curve *c*) corresponds to the deficit (the difference between the desired characteristic curve *d* and the curve *a*) of the output voltage of the push-pull frequency demodulator 41 with a given frequency deviation of the incoming oscillation.

Figure 3:
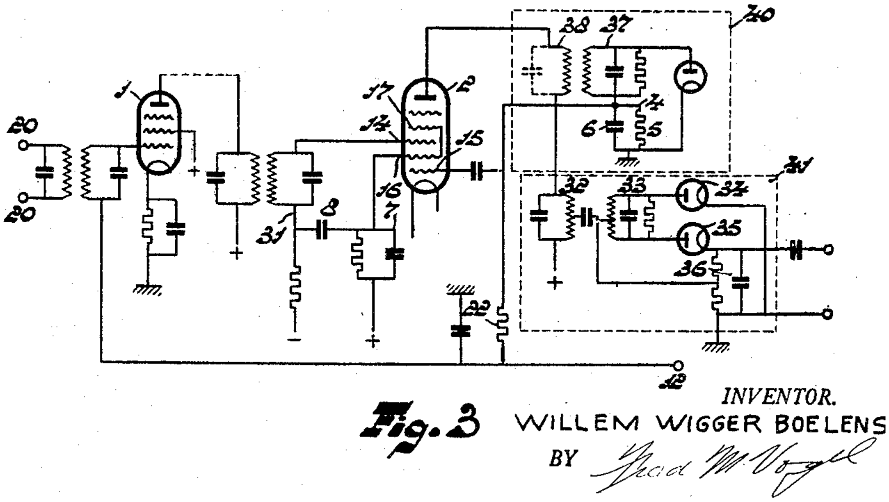

Fig. 3, which is similar to Fig. 1 of the drawing accompanying U. S. Patent No. 2,654,026, shows a similar arrangement comprising a push-pull frequency demodulator 41 and a device 40 providing third harmonic compensation, tube 2 also serving as a reflex amplifying stage for the voltage set up across the filter 4 by means of, for example, the tube portion cathode-first control grid 15 and first screen grid 16, and as an amplifying stage also serving as a modulator stage for the input oscillation by means of the second control grid 14, which, in addition to the input oscillation, has supplied to it the modulating oscillation through the conductor 31.

What I claim is:

1. Apparatus for demodulating frequency modulated oscillations subject to having undesired amplitude variations, comprising an amplitude modulator having a first input circuit for receiving oscillations to be modulated and a second input circuit for receiving a modulation control voltage and an output circuit, a source of said frequency modulated oscillations connected to said first input circuit, a frequency demodulator having a frequency response characteristic which is non-linear within the frequency modulated range of said oscillations, a frequency dependent device comprising a frequency dependent member coupled electrically to said output circuit to receive oscillations therefrom and having a substantially linear amplitude response characteristic and a frequency response characteristic which is non-linear within the frequency modulated range of said oscillations substantially proportionately to the non-linear frequency response characteristic of said frequency demodulator and means connected to said member to derive a control voltage in response to the oscillations received therefrom, means connected to electrically couple said frequency demodulator to said output circuit independently of said frequency dependent member, and means connected to supply said control voltage to said second input circuit with a polarity to cause the oscillations at said output circuit to be substantially independent of said undesired amplitude variations and to have an amplitude variation with respect to frequency which compensates for said non-linear response characteristic of said frequency demodulator, whereby the frequency demodulator produces substantially undistorted demodulated oscillations.

2. Apparatus for demodulating frequency modulated oscillations subject to having undesired amplitude variations, comprising an amplitude modulator having a first input circuit for receiving oscillations to be modulated and a second input circuit for receiving a modulation control voltage and an output circuit, a source of said frequency modulated oscillations connected to said first input circuit, a frequency demodulator having a frequency response characteristic which is non-linear within the frequency modulated range of said oscillations, a frequency dependent device comprising a tuned circuit coupled electrically to said output circuit to receive oscillations therefrom and having a substantially linear amplitude response characteristic and a frequency response characteristic which is non-linear within the frequency modulated range of said oscillations substantially proportionately to the non-linear frequency response characteristic of said frequency demodulator and a rectifier means connected to said tuned circuit to derive a control voltage in response to the oscillations received therefrom, means connected to electrically couple said frequency demodulator to said output circuit independently of said tuned circuit, and means connected to supply said control voltage to said second input circuit with a polarity to cause the oscillations at said output circuit to be substantially independent of said undesired amplitude variations and to have an amplitude variation with respect to frequency which compensates for said non-linear response characteristic of said frequency demodulator, whereby the frequency demodulator produces substantially undistorted demodulated oscillations.

References Cited in the file of this patent

UNITED STATES PATENTS

| | | |
|---|---|---|
| 2,264,724 | Schonfeld | Dec. 2, 1941 |
| 2,285,957 | Wheeler | June 9, 1942 |
| 2,353,468 | Holst | July 11, 1944 |
| 2,420,249 | Korman | May 6, 1947 |
| 2,472,301 | Koch | June 7, 1949 |
| 2,483,195 | Goldberg | Sept. 27, 1949 |
| 2,539,818 | Dome | Jan. 30, 1951 |